Dec. 16, 1969  P. M. KNAPP ETAL  3,483,636
HIT INDICATOR SYSTEM WITH BARREL-BORE MOUNTED PHOTOSCOPE
Filed Feb. 28, 1967  2 Sheets-Sheet 1
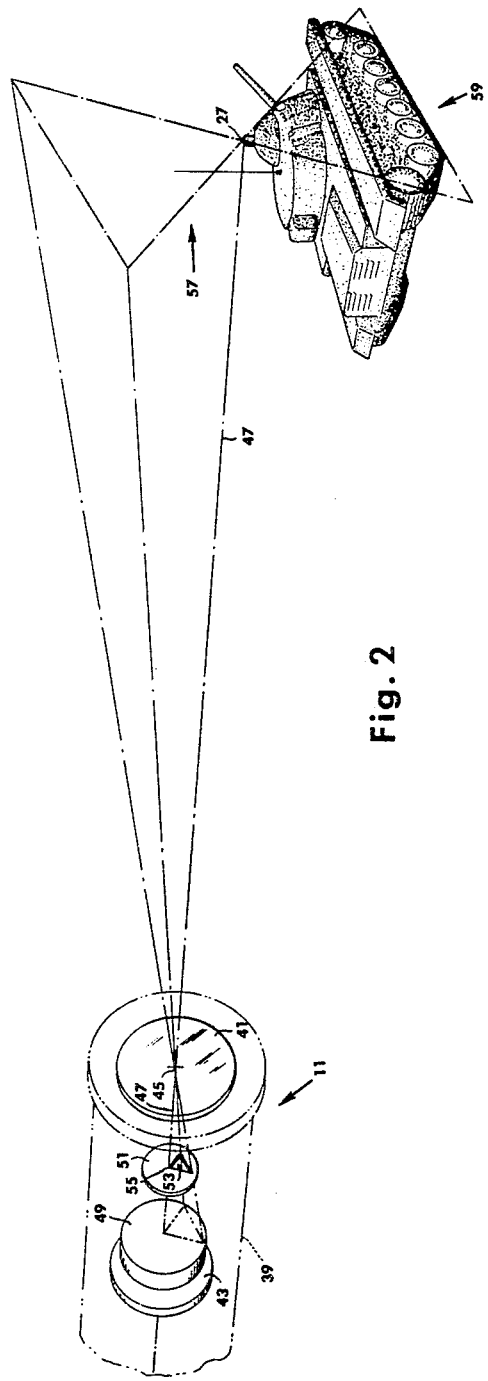
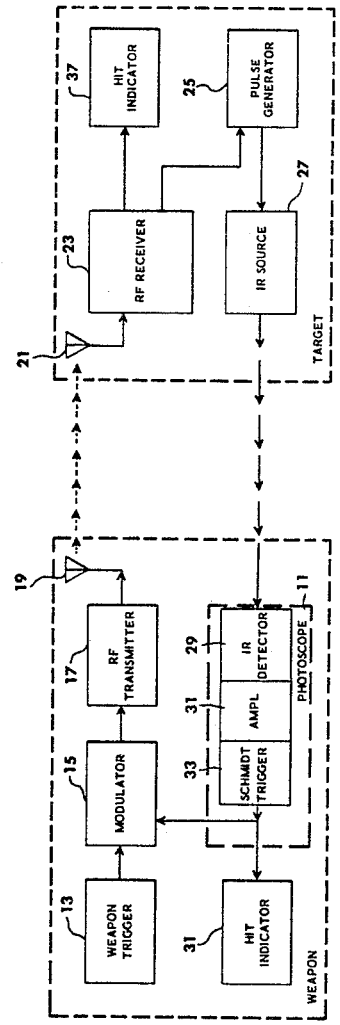
PHILLIP M. KNAPP
PAUL E. WRIGHT
INVENTOR.

Dec. 16, 1969    P. M. KNAPP ET AL    3,483,636
HIT INDICATOR SYSTEM WITH BARREL-BORE MOUNTED PHOTOSCOPE
Filed Feb. 28, 1967    2 Sheets-Sheet 2

PHILLIP M. KNAPP
PAUL E. WRIGHT
*INVENTOR.*

BY

United States Patent Office 3,483,636
Patented Dec. 16, 1969

3,483,636
HIT INDICATOR SYSTEM WITH BARREL-BORE
MOUNTED PHOTOSCOPE
Phillip M. Knapp, Cockeysville, and Paul E. Wright,
Owings Mills, Md., assignors to AAI Corporation,
Cockeysville, Md., a corporation of Maryland
Filed Feb. 23, 1967, Ser. No. 619,459
Int. Cl. F41g 3/26; A63f 9/02
U.S. Cl. 35—25                                    6 Claims

ABSTRACT OF THE DISCLOSURE

A hit indicator system is disclosed for simulated hit-kill field practice which permits the use of a standard tank cannon with a photoelectric telescope inserted inside the cannon barrel. One end of the photoelectric telescope has a beveled edge which aids in centering the photoelectric telescope in the barrel, while the other end is attached by means of a bell crank and a cable to an anchor bracket mounted in the breech of the tank cannon so as to firmly hold the photoelectric telescope in the barrel of the tank cannon. The arrangement is an improvement particularly applicable to hit indicator arrangements as shown in U.S. Patents Nos. 3,104,478 and 3,169,191.

---

In U.S. Patent No. 3,104,478, a hit indicator system is disclosed for use in tactical field training of personnel on a realistic basis. In such a system, apparatus is connected to a weapon, for example a tank cannon, so that when a gunner aims the tank cannon at a target, for example another tank, and operates the firing mechanism of the tank cannon, an omnidirectional radio frequency target interrogation signal is transmitted. The radio frequency signal causes an infrared light source centrally mounted on the target to radiate a light signal. If the tank cannon is properly aimed, a photoelectrically responsive element such as a photodiode, having a light-sensitive surface of variable sensitivity, disposed at, or near the focal plane of a telescopic lens arrangement, such being hereinafter referred to as a photoscope or a photoelectric telescope, which is attached to the tank cannon and suitably aligned therewith, will receive the infrared signal and cause an electrical output signal having an amplitude which is a function of the intensity of the light received by the photoscope and which may desirably cause the apparatus to produce another radio frequency signal which informs the tank target that a hit has been scored. In addition, or alternatively, the weapon-connected apparatus may desirably produce a signal informing the gunner that a hit has been scored.

In using a hit indicator system during tactical field training, it is often necessary to consider the characteristics of the weapon so as to determine a suitable location for the photoscope. In some instances, such as when the weapon is a rifle, it is sufficient to merely clamp the photoscope onto the external surface of the barrel of the weapon. However, when the weapon with which the photoscope is to be used is a tank, it is not desirable to merely clamp the photoscope onto the barrel of the tank cannon, because in such an exposed position it is very susceptible to damage during tactical field training in which, among other things, the tank may have to smash through heavy underbrush and even small structures. Accordingly, it is a feature of this invention to attach the photoscope to the weapon in a location where it will be protected from damage during the tactical field training, which feature is effected according to the invention by mounting the photoscope within the bore of the weapon barrel.

To properly use a hit indicator system it is necessary for the photoscope to be suitably aligned with the weapon it is attached to. Also it is necessary for the photoscope to be able to freely move with the barrel of the weapon as the barrel is pointed in various directions without interfering with the alignment of the photoscope with the bore of the tank cannon. It is also desirable that parallax errors between the weapon barrel and the photoscope be reduced to a minimum. Accordingly it is a feature of this invention to attach the photoscope to a tank cannon, or other gun, in such a manner that it is suitably aligned with the bore and the alignment will not be disturbed irrespective of the movement of the tank cannon, which feature is advantageously effected by mounting the photoscope within the bore of the weapon barrel.

To score a hit with the hit indicator system described above, it is necessary for the infrared light source mounted on the tank target to be within the field of view of the photoscope. It is normally desirable to employ a suitably shaped mask placed in front of the photoelectrically responsive element of the photoscope, whereby the field of view of the photoscope acquires a distinctive shape thereby providing a hit pattern which is much more selective than would be afforded by an unmasked photo-responsive element and it is necessary to maintain the mask in a fixed upright position with respect to the barrel of the gun so as to not disturb the hit pattern. Such angular fixation of position of the photoscope would of course also be equally desirable with unmasked diodes having an asymmetrical configuration so as to provide the desired selective field of view. Accordingly, it is a feature of this invention to attach the photoscope within the weapon barrel in a manner such that the photoscope is not angularly twisted or turned during the course of the tactical field training as the barrel is moved in the course of pointing in various directions.

As previously discussed, the photoelectrically responsive element contained in the photoscope responds to a light signal to cause an electrical output signal. The amplitude of the electrical output signal is relatively small, and it is therefore desirable to locate the electrical apparatus associated with the hit indicator system near the photodiode so that the leads connecting the photodiode to the electrical apparatus associated with the hit indicator system do not become so long as to unduly attenuate the electrical output signal from the photoelectrically responsive element. However, the characteristics of the weapon may prevent the electrical apparatus from being located nearby the photoelectrically responsive element and accordingly other steps must be taken to overcome the relatively high impedance associated with a long lead line. Accordingly, it is a further feature of the present invention to house suitable amplification and trigger circuitry of the electrical apparatus within the housing of the photoscope so that the lead lines between the photoelectrically responsive element and this portion of the electrical apparatus is very short and thereby prevents the photosensitive element signal from being unduly attenuated before reaching the trigger circuitry of the hit indicator system in response to an incoming target light signal.

In accordance with the present invention a photoscope is provided which consists of two adjacent compartments connected together so as to form a single unit which is mounted within the barrel of a tank cannon, thereby protecting it from damage during the course of the tactical field training and obviating parallax errors between gun barrel and photoscope. The first compartment, which faces out through the muzzle end of the barrel, contains a lens having an optical axis which focuses a light signal from a target onto a light sensitive surface of a photoelectrically responsive element which is located at the focal point of the lens and is disposed perpendicularly to the optical axis.

The photoscope is bore sighted with the barrel of the cannon as through the medium of a beveled ring which engages the end of the barrel and centers that end of the photoscope. The other end of the photoscope is generally centered as through the medium of a ring having a diameter providing a light sliding fit with the bore of the barrel and attached to the outside perimeter of the photoscope. The photoscope is held firmly in the barrel of the cannon by means of a taut cable which is attached to the opposite end of the photoscope through an interconnecting bell crank, the pivot mounting of which is firmly pressed against the bore of the barrel. The opposite end of the cable is attached to a bracket mounted in the breech of the tank cannon. By attaching the cable to a bracket in the breech of the cannon rather than to some point external of the cannon, the cannon is free to move so as to point in any direction without the cable of the photoscope being pulled in various directions by the movement of the barrel of the cannon as it is twisted in different directions and thereby disturbing the alignment of the photoscope. During the course of tactical field training the photoscope tends to twist and turn inside the barrel of the cannon as a result of jolts to the cannon. Since a mask is placed in front of the photodiode so as to limit the field of view of the photoscope and thereby provide a hit pattern with a distinctive shape, the twisting of the photoscope inside the barrel would of course disturb the photosensitive element hit pattern. To prevent the twisting of the photoscope inside the barrel a pin is attached to the outside surface of the photoscope which engages a groove of the rifling of the barrel and thereby holds the photoscope in a fixed upright position so as to provide a desired fixed hit pattern.

An amplifier and a trigger circuit, for example a Schmidt trigger, are contained in the rearward compartment of the photoscope and connected to the photoelectrically responsive element by a desirably short lead having very little impedance. The pulse supplied by the Schmidt trigger in response to the electrical output signal of the photoelectrically responsive element is connected to the remainder of the electrical apparatus by means of a conductive cable attached to the rearward end of the photoscope to the remainder of the electrical apparatus which may be suitably located adjacent to the tank cannon, and since the actuating pulse from the Schmidt trigger has a sufficiently large amplitude and attenuation caused by the conductance cable does not prevent the actuating pulse from initiating the operation of the remainder of the hit indicator system.

Still other objects, features and attendant advantages will become apparent to those skilled in the art from a reading of the following description of a preferred embodiment and mode of practice of the invention, taken in conjunction with the accompanying drawings wherein:

FIG. 1 is a block diagram of an overall "hit indicator" system utilizing a radio frequency link and an infrared link.

FIG. 2 illustrates the optical system of the photoscope wherein the effective field of view is determined by the size of the photodiode, the focal length of the lens, and a mask which limits the effective area of the light sensitive surface of the photodiode.

Figure 3:
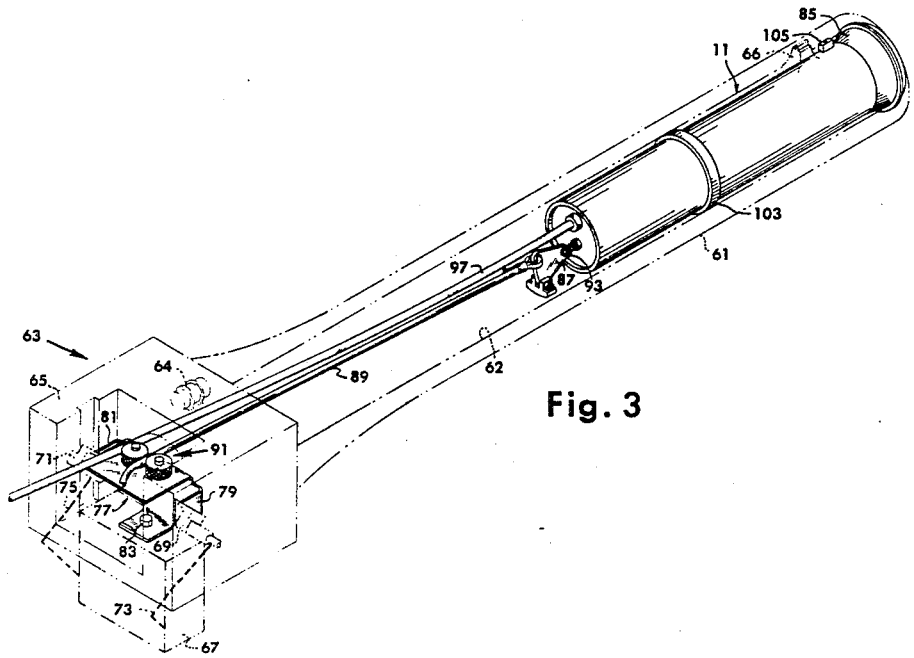
FIG. 3 illustrates the mounting of a photoscope in the barrel of a conventional tank cannon in accordance with the present invention.

Referring now in detail to the figures of the drawings, FIG. 1 shows a hit indicator system in which the photoscope arrangement 11 of this invention is particularly useful. In operation, when a tank gunner believes he has a target properly aligned with the sights of his tank cannon, he pulls a trigger mechanism 13. This causes a pulse to be supplied to a modulator 15 which turns on a radio frequency transmitter 17 thereby causing a radio frequency pulse signal to be transmitted omnidirectionally from an antenna 19 mounted on top of the tank. This signal is received by an antenna 21 mounted at the target and detected in a receiver 23. The receiver 23 actuates a pulse generator 25 which causes an infrared light source 27 mounted centrally on the target, so as to be readily visible from all directions, to radiate a pulse signal. If the tank cannon is properly aimed at the target, the infrared light signal is received by an infrared detector 29 which is contained in the photoscope 11. The infrared signal is focused on the infrared detector 29 and causes an electrical output signal which is amplified in an amplifier 31 and operates a trigger circuit 33 which supplies an electrical pulse to both the modulator 15 and a hit indicator 35 of the tank. The pulse supplied to the modulator 15 causes another radio frequency signal to be transmitted to the target, which signal actuates a target hit indicator 37 and thereby informing the target that a hit has been scored. The pulse supplied to the hit indicator 35 of the tank actuates it and informs the gunner that a hit has been scored.

FIG. 2 illustrates the optical system of a photoscope, generally indicated at 11 for use in a hit indicator system as shown in FIG. 1. The photoscope 11 generally consists of a tubular housing 39 for mounting in the barrel of the tank cannon. The tubular housing 39 contains a lens 41 mounted in the forward portion of the housing, and a photoelectrically responsive element 43 mounted rearward of the lens 41. In the very center of the lens 41 is a nodal point 45 which may be defined as the point on the lens 41 through which a ray of light can pass undeflected. Passing perpendicularly through the lens 41 at the nodal point is the optical axis 43 of the lens 41. The optical axis 47 of the lens 41 is desirably parallel to the tubular housing 39. Mounted perpendicularly to the optical axis 47 of the lens 41 and at the focal length of the lens 41 is a disc-shaped light sensitive surface 49 of the light responsive element 43, the center of which is desirably positioned on the optical axis 47. Disposed in front of the light sensitive surface 49 of the photoelectrically responsive element 43 is a mask 51 which serves to define or limit the portion of the light sensitive surface 49 which can receive a light signal from a target. In this instance, the mask 51 is shown as having a triangular shaped cutout generally indicated at 53 with the apex 55 of the triangle 53 being located at the center of the light sensitive surface 49 and intersected by the optical axis 47 of the lens 41. The area light sensitive surface 49 capable of receiving a light signal from a target, in conjunction with the lens 41, determines the field of view generally indicated at 57 throughout which the light signal from a target will be received. Distance-to-target compensation may be achieved in the system as through use of a suitable variable sensitivity photodiode for the photosensitive element 43 in which the diode may have decreasing sensitivity as a function of the radial distance from its center, as taught for instance in U.S. Patent No. 3,083,474; or other suitable distance compensation may be employed as desired.

In FIG. 2, the photoscope is pointed at a tank target in such a direction that the optical axis 47 of the photoscope 11 intersects the infrared light source 27 centrally mounted on top of the target so as to be readily visible from all directions. The tank is shown generally encompassed by a triangle generally indicated at 59 and having the same size and shape as the field of view 57 indicated by the projection of the mask 51. The triangular area enclosing the tank indicates the detectably vulnerable area of the tank throughout which the optical axis 47 can be aimed with a pick-up of the light signal by the light sensitive portion 49 of the photoelectrically responsive element 43 not covered by the mask 51. Thus, if the optical axis 47 of the photoscope 11 intersects the lower left hand portion of the triangle 59 enclosing the tank, then the infrared light source 27 will be located in the upper right hand corner of the limited field of view 57 and the light sensitive surface 49 of the photodiode 43 will receive the light signal. On the other hand if the photoscope 11 is aimed so that the optical axis 47 intersects the lower right hand portion of the triangle 59 enclosing the tank, then the infrared source 27 will be located in the upper left corner of the triangular field of view 57 and the light signal will be received by the light sensitive surface 49 of the photoelectrically responsive element 43. Between these three positions the light source 27 will appear in the triangular field of view 57 and be received by the light sensitive surface 49. Of course, such an asymmetrically masked photodiode 43 requires that photoscope 11 must remain in an upright vertical position so that the field of view 57 does not become canted and thereby affect the accuracy of the hit indicator system.

In FIG. 3 is shown in phantom lines a typical tank cannon having a barrel 61 with a rifled bore 62, aiming element 64 and 66, and a breech generally indicated at 63, comprising a breech ring 65, a breech block 67, and a pair of extractor fingers 69 and 71 which remove the casing of a spent shell from the barrel 61. The extractor fingers 69 and 71 are mechanically interconnected as indicated by the dashed lines 73 and 75 to the breech block 67. When a shell is loaded into the breech 63 of the cannon, the rim of the shell normally engages the extractor fingers 69 and 71 which pivot them clockwise about their pivot mount in the breech ring, which in turn enables the breech block 67 to move vertically upward so as to hold the shell in the barrel 61. When employing a hit indicator system during tactical field training according to the present invention, a suitably shaped bracket generally indicated at 77, having a pair of triangular shaped wings 79 and 81 is placed in the breech ring 65 so that the wing portions 79 and 81 of the bracket 77 engage the extractor fingers 69 and 71 and prevent them from moving, the breech block 67 being thereby interlocked in its downwardly located position. The bracket 77 rests upon the top of the breech block 67 and may be suitably held in place as by a bolt 83 which is screwed into the breech block 67 in a hole which is normally used for the purpose of removing the breech block 67 from the tank cannon for repair work. The photoscope 11 is inserted in the muzzle end of the barrel 61 with beveled ring 85 at the forward end of the photoscope 11 engaging the end of the barrel 61 and serving to center that end in the bore 62 of the barrel 61. The opposite end of the photoscope 11 is attached by means of a bell crank 87 and a plastic-coated cable 89 to a cable clamping device generally indicated at 91 on the bracket 77 in the breech ring 65. The bell crank 87 has a triangular shape, one corner of which is attached to a bifurcated stud 93 connected to the rearward end of the photoscope 11. A second corner of the triangular shaped bell crank 87 is connected to a bifurcated shoe 95, formed of relatively soft, non-damaging material such as plastic, which engages the side of the bore 62 of the barrel 61. The plastic-coated cable 89 is attached to the third corner of the triangular shaped bell crank 87 and exerts tension on the bell crank 87 so as to pivot it on the bifurcated stud 93, and press the plastic shoe 95 against the side of the barrel 61, thus holding the photoscope 11 firmly in the barrel 61. The photoscope 11 is connected to the external electrical apparatus associated with the hit indicator system by means of a conductive cable 97 which is attached to the rearward end of the photoscope 11 and extends through the breech 63 of the tank cannon.

Figure 4:
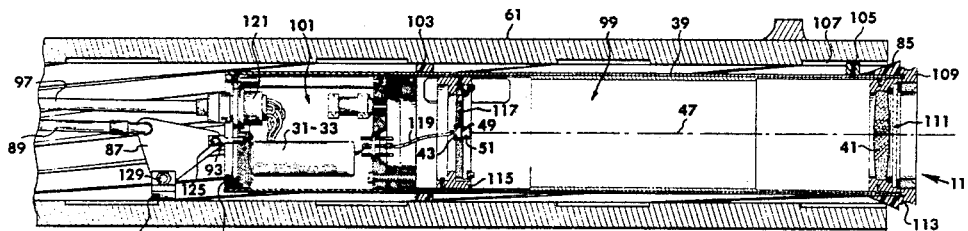
FIG. 4 shows a cut-away view of a rifled cannon barrel with a photoscope mounted therein according to the present invention.

In FIG. 4 is shown a cross-sectional view of the details of a photoscope 11 suitably mounted in the rifled barrel 61 of a tank cannon. The photoscope 11 consists of a tubular housing 39 having two separate compartments generally indicated at 99 and 101 longitudinally disposed in the tubular housing 39. At the forward end of the photoscope 11 and attached to the tubular housing 39 is a beveled ring 85 which engages the end of the barrel 61 so as to center the forward end of the photoscope 11 in the bore 62 of the barrel 61. Toward the rear end of the barrel 61 and attached to the tubular housing 93 is a spacer ring 103 having an outside diameter forming a light sliding fit with the land area of the barrel bore 62. The beveled ring 85 is held firmly against the end of the barrel 61 by the tension the cable 89 exerts on the opposite end of the photoscope 11. An index pin 105 is suitably secured to or formed on the outside surface of the tubular housing 39 and engages a particular groove 107 of the rifling to thereby maintain the photoscope 11 in the desired upright angular position and prevents the photoscope 11 from twisting inside the barrel 61. In front of the beveled ring 85 is an annularly grooved lens mounting ring 109 containing a lens 41 and a disc-shaped window 111 which serves to protect the lens 41 from being scratched during the course of the tactical field training. The groove 113 of the lens mounting ring 109 serves to facilitate the removal of the photoscope 11 from the barrel 61 by providing a finger grip. Spaced rearward of the lens mounting ring 109 and in the forward compartment 99 and disposed generally at the focal plane of the lens 41 is a ring 115 in which is mounted a pad 117, the center of which contains a photodiode 43 located in a position such that the apex of the effectively triangular light-sensitive surface 43 is perpendicularly intersected by the optical axis 47 of the lens 41.

Connected to the photodiode 43 is a short conductive cable 119 which leads to the electrical apparatus 31 and 33 contained in the rearward compartment 101 of the photoscope 11, which in turn is connected to a terminal plug 121 mounted in a plate 123 which forms the rearward end of the photoscope 11. The electrical apparatus 31 and 33 in the rearward compartment 101 is connected to the remainder of the hit indicator system as shown in FIG. 1 by means of the terminal plug 121 which connects the electrical apparatus 31 and 33 through a long conductive cable 97 which extends through the breech 63 of the tank cannon. On the other side of the plate 123 is fastened a bifurcated stud bolt 93 which is pivotally attached by a nut and bolt 125 to a first corner of the triangularly shaped bell crank 87. A second corner of the triangularly shaped bell crank 87 is attached to a bifurcated plastic shoe 127 by means of a nut and bolt 129 which engages the bore 62 of the rifled barrel 61. Attached to the third corner of the bell crank 87 is the plastic-coated cable 89 which is employed to exert a longitudinal force on that corner of the bell crank 87 thus causing a moment of force to press the plastic shoe 127 against one side of the rifled bore 62 of the barrel 61 which in turn effects a laterally securing force on the photoscope 111 and spacer ring 103 toward the opposite side of the rifled bore 62. As previously mentioned in regard to FIG. 3, the opposite end of the plastic-coated cable 89 is attached to anchor bracket 77 located in the breech 63 of the tank cannon.

Figure 5:
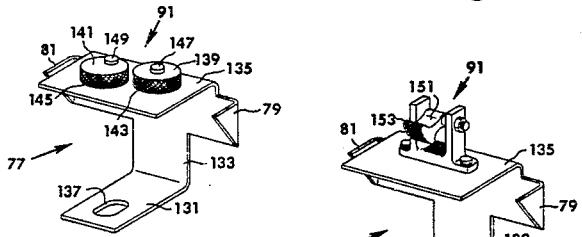
FIG. 5 shows an anchor bracket having a special configuration suitable for installation in the breech of the tank cannon; two additional modifications thereof for clamping and fixedly holding the cable which is attached to one end of the photoscope being shown in FIGS. 6 and 7.
Figure 6:
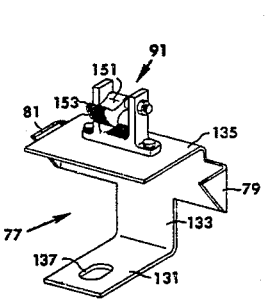
Figure 7:
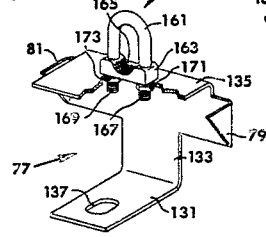

The preferred anchor bracket construction takes the form of a channel having a flat horizontal bottom member 131, a vertical support member 133, and a flat horizontal top member 135. The vertical support member 133 has wing members 79 and 81 on both sides thereof which are triangularly shaped and bent perpendicularly in the same direction as the top and bottom horizontal members 131 and 135 respectively, so as to engage the movable extractor fingers 69 and 71 mounted in the breech ring 65. The flat horizontal bottom member 131 has a slot 137 therein through which a bolt 83 is inserted and threadedly engages a threaded hole in the top of the breech block 67 and securely fasten the bracket 77 thereto. On the flat horizontal top member 135 is located a suitable clamp generally indicated at 91 for securely fastening the plastic-coated cable 87 to the bracket 77. Three forms of cable clamping arrangements for the anchor bracket are shown respectively in FIGS. 5, 6 and 7. In FIG. 5 the clamp 91 consists of two circular wheels 139 and 141 with knurled edges 142 and 145 with the axes 147 and 149 perpendicularly attached to the flat horizontal top member 135. One wheel 139 has a central axis 147 and the axis 149 of the other wheel 141 is off-center. With this arrangement the plastic-coated cable 89 is drawn between the knurled edges 143 and 145 of the two wheels 139 and 141 and the wheel 141 with the off-center axis 149 is rotated counterclockwise so as to firmly press the plastic-coated cable 89 against the knurled edge 143 of the wheel 139 having the concentric axis 147 and thereby self-lock the cable 89 in the desired tensioned condition. Any subsequent axial withdrawal force exerted on the cable 89 from the photoscope end tends to draw the wheel 141 with the off-center axis 149 into tighter clamping relation to the wheel 139 with the concentric axis 147. In FIG. 6 is shown another type of anchor bracket clamp 91 including a first member 151 having a half-moon shaped knurled head 153 eccentrically pivotally mounted between vertical support elements 155 and 157 formed or secured on the anchor bracket 77. The plastic-coated cable 89 is drawn between the support elements and is gripped between the upper surface of the bracket 77 and the half-moon shaped head of the pivoted eccentric member which engages the plastic-coated cable 89 and presses it against the adjacent base surface of the bracket. In FIG. 7 is shown a third type of clamp 91 including a U-bolt 161 and a base member 163 having a knurled indentation center 165 thereof. The ends 167 and 169 of the U-bolt 161 are threaded and the U-bolt 161 is slidably secured through lateral holes in the bracket by means of nuts 171 and 173 which engage the threaded ends 167 and 169 on the opposite side of the flat horizontal top member 135. The plastic-coated cable 89 is drawn between the U-bolt 161 and the base member 163 and when the nuts 171 and 173 engaging the threaded ends 167 and 169 of the U-bolt 161 are tightened, the U-bolt 161 is drawn tight and the cable 89 is held in place by the pressure of the U-bolt 161 forcing it against the knurled indentation 165 of the base member 161. Various other anchor bracket constructions could be employed within the purview of the invention.

In operation, each tank participating in simulated tactical field training employing a hit indicator system of the type described, will have an omnidirectional radio frequency antenna 19 and an infrared source 27 centrally mounted on top of the tank. Each tank cannon will have a photoscope 11 inserted in the bore 62 and properly positioned therein by the beveled ring 85 at the forward end of the photoscope 11 and the spacing ring 103 towards the rearward end of the photoscope 11. The photoscope 11 is held firmly in the bore 62 of the cannon by means of the plastic-coated cable 89 and the triangularly shaped bell crank 87, one corner of which is pivotally attached to the bifurcated stud bolt 93 located in the plate 123 at the rearward end of the photoscope 11. The taut plastic-coated cable 98 attached to the second corner of the bell crank 87 exerts a moment of force against the plastic shoe 127 which is pivotally attached to the third corner of the bell crank 87 thereby pressing the shoe 127 against one side of the bore 62 of the barrel 61 and the spacing ring 103 against the other side of the bore 62 of the barrel 61, so as to secure the photoscope 11 in the cannon barrel 61. The pin 105 attached to the forward end of the photoscope 11 engages a groove 107 of the rifled barrel 61 and fixedly secures the photoscope 11 in the desired angular position. The opposite end of the plastic-coated cable 89 is suitable clamped in a taut condition to the anchor bracket 77 in the breech 63 of the tank cannon. The bracket 77 is securely fastened to the breech block 67 by means of a bolt 83 inserted in the slot 137 in the flat bottom member 131 of the bracket 77. The wing shaped members 79 and 81 engage the finger extractors 69 and 71 located in the breech ring 65 and thereby prevent the breech block 67 from moving vertically upward. The electrical apparatus 31 and 33 contained in the rearward compartment 101 of the photoscope 11 is connected to the remainder of the electrical apparatus of the hit indicator system by means of the conductive cable 97 extending from the terminal plug 121 in the plate 123 of the photoscope 11 through the breech 63 of the tank cannon.

During the course of the tactical field training a tank gunner will spot a target in the form of another tank, as indicated in FIG. 2. He will then take aim, and, when he believes the target is properly aimed with the sights 64 and 66 of his cannon, operate the firing mechanism 17 of the tank cannon. This causes a pulse to be supplied to the modulator 15 which turns on a radio frequency transmitter 17, thereby causing a pulse to be transmitted omnidirectionally from the antenna 19 mounted on top of the tank. This signal is received by the antenna 21 at the target and detected in the receiver 23. The receiver 23 actuates the pulse generator 25 thereby causing the infrared source 27 mounted on top of the target to radiate a light signal. If the tank cannon is properly aimed, the light signal will be received by the photoscope 11 and focused by the lens 41 onto the light-sensitive surface 49 of the photodiode 43, thereby causing the photodiode 43 to produce an electrical output signal of useful value which is supplied to the rearward compartment 101 of the photoscope 11 by a short lead 119. In the rearward compartment 101 of the photoscope 11, the electrical output signal is amplified by the amplifier 31 and operates the Schmidt trigger 33 which produces a pulse that is supplied to both the modulator 15 and the hit indicator 35 of the tank. The pulse supplied to the modulator 15 causes another radio frequency signal to be transmitted to the target which actuates the target hit indicator 37 thereby informing the target that a hit has been scored. The pulse supplied to the hit indicator 35 of the tank actuates it and informs the tank gunner that a hit has been scored.

Throughout the tactical field training, it is quite likely that the tank will smash through heavy underbrush and perhaps even small structures. However, with the photoscope installed inside the barrel of the tank cannon, it is protected from any damage which might result from being struck while passing through heavy underbrush or small structures. Also, with the photoscope located inside the barrel of the cannon, parallax errors resulting from clamping the photoscope to the barrel in an offset position are eliminated.

While the invention has been illustrated and described with respect to a single preferred embodiment, it will be apparent to those skilled in the art that various modifications and improvements may be made without departing from the scope and operation of the invention. Accordingly, it is to be understood that the invention is not to be limited by the illustrative embodiment but only by the scope of the appended claims.

That which is claimed is:

1. In a simulated hit indicator arrangement including a weapon having a barrel and a target interrogating transmitter operatively associated with a target signal source and a photoscope in the form of a photoelectric target signal responsive telescope detector arrangement arranged for synchronous directive motion with the barrel of the weapon, said photoscope having a housing fitting within and being mounted in the bore of the weapon barrel, said photoscope having a light limiting mask being disposed asymmetrically relative to the optical axis of said photoscope which serves to define a field of view having a distinctive shape and providing a selective hit pattern, said photoscope housing being secured in the barrel of the weapon against twisting and changing its vertical position and thereby maintaining said light limiting mask in a fixed, angular position, and said photoscope being secured in the bore of said weapon barrel and a pin and slot indexing arrangement formed between said barrel bore and said photoscope housing.

2. In a simulated hit indicator arrangement including a weapon having a barrel and a target interrogating transmitter operatively associated with a target signal source and a photoscope in the form of a photoelectric target signal responsive telescope detector arrangement arranged for synchronous directive motion with the barrel of the weapon, said photoscope having a housing fitting within and being mounted in the bore of the weapon barrel.

said photoscope having a light limiting mask being disposed asymmetrically relative to the optical axis of said photoscope which serves to define a field of view having a distinctive shape and providing a selective hit pattern, said photoscope housing being secured in the barrel of the weapon against twisting and changing its vertical position and thereby maintaining said light limiting mask in a fixed, angular position, said barrel being rifled with lands and grooves; and said photoscope having a housing carrying said mask, said housing having a pin attached thereto which engages a groove of said rifled barrel so as to secure said photoscope in a fixed, angular position within said barrel.

3. In a simulated hit indicator arrangement including a weapon having a barrel and a target interrogating transmitter operatively associated with a target signal source and a photoscope in the form of a photoelectric target signal responsive telescope detector arrangement arranged for synchronous directive motion with the barrel of the weapon.

said photoscope having a housing fitting within and being mounted in the bore of the weapon barrel.

said photoscope having a beveled ring attached to the forward end thereof and which engages the muzzle end of the barrel so as to center it therein; and a tension securing arrangement including an anchor element spaced apart and rearwardly from said photoscope, and a tension connector extending along the bore of said barrel and connecting said photoscope to said anchor element in secured relation within said barrel.

4. In a simulated hit indicator arrangement as defined in claim 3:

said tension arrangement being attached to said photoscope by means of a bell crank, said bell crank being pivotally attached to said photoscope and having a shoe which presses against the bore of said barrel, said tension connector being a cable secured to and extending between said anchor element and said bell crank.

5. In a simulated hit indicator arrangement as defined in claim 4:

said barrel having a breech connected thereto and containing a movable breech element with a firing pin; and said anchor element being contained in said breech.

6. In a simulated hit indicator arrangement as defined in claim 5, wherein:

said anchor support engaged a breech-element-motion-preventing interlock in said breech so as to prevent movement of said movable breech element.

References Cited

UNITED STATES PATENTS

| | | | |
|---|---|---|---|
| 3,083,474 | 4/1963 | Knapp | 35—25 |
| 3,104,478 | 9/1963 | Strauss et al. | 35—25 |
| 3,271,032 | 9/1966 | Rabinowitz et al. | 273—101.1 |

EUGENE R. CAPOZIO, Primary Examiner

P. V. WILLIAMS, Assistant Examiner

U.S. Cl. X.R.

273—101.2